(12) United States Patent
Widmann et al.

(10) Patent No.: US 7,455,129 B2
(45) Date of Patent: Nov. 25, 2008

(54) DRILLING AND/OR CHISELING TOOL

(75) Inventors: Rainer Widmann, Ravensburg (DE); Bernhard Moser, Altshausen (DE)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 10/558,964

(22) PCT Filed: Sep. 23, 2004

(86) PCT No.: PCT/DE2004/002109

§ 371 (c)(1),
(2), (4) Date: Dec. 1, 2005

(87) PCT Pub. No.: WO2005/049295

PCT Pub. Date: Jun. 2, 2005

(65) Prior Publication Data

US 2006/0243496 A1 Nov. 2, 2006

(30) Foreign Application Priority Data

Nov. 17, 2003 (DE) ................. 103 53 730
Apr. 5, 2004 (DE) ............... 10 2004 017 286

(51) Int. Cl.
*E21B 10/26* (2006.01)
(52) U.S. Cl. ...................... 175/385; 408/225
(58) Field of Classification Search ............... 175/385, 175/388, 394; 408/199, 223, 224, 225, 227, 408/229, 230; 76/108.6
See application file for complete search history.

(56) References Cited

U.S. PATENT DOCUMENTS

| | | | | |
|---|---|---|---|---|
| 1,746,046 A * | 2/1930 | McIntosh | .................... | 175/395 |
| 2,879,036 A * | 3/1959 | Wheeler | ...................... | 175/391 |
| 4,968,193 A * | 11/1990 | Chaconas et al. | ........... | 408/211 |
| 5,011,342 A * | 4/1991 | Hsu | ........................... | 408/224 |
| 5,181,811 A * | 1/1993 | Hosoi | ......................... | 408/230 |
| 5,570,978 A * | 11/1996 | Rees et al. | .................. | 408/144 |
| 6,102,634 A | 8/2000 | Turner et al. | | |
| 6,190,097 B1 * | 2/2001 | Thomas | ..................... | 408/230 |
| 6,328,506 B1 | 12/2001 | Turner et al. | | |
| 7,001,120 B2 * | 2/2006 | Moser et al. | ................. | 408/225 |
| 2003/0077134 A1 | 4/2003 | Moser et al. | | |

FOREIGN PATENT DOCUMENTS

| | | |
|---|---|---|
| DE | 44 06 513 | 8/1995 |
| DE | 100 38 039 | 2/2001 |
| DE | 102 08 630 A1 | 4/2003 |
| EP | 0 761 927 | 3/1997 |

* cited by examiner

*Primary Examiner*—Jennifer H Gay
*Assistant Examiner*—Daniel P Stephenson
(74) *Attorney, Agent, or Firm*—Michael J. Striker

(57) ABSTRACT

A drilling and/or chiseling tool, in particular for machining materials such as concrete, rock, masonry, and the like, having a hard metal cutting element (1) contained in the machining end of the tool head, a radially outer, second working region (II) of the hard metal cutting element (1) being set back in relation to a central, first working region (I) of the hard metal cutting element (1) and the two working regions (I, II) transitioning into each other via a third working region (III). The third working region (III) is at least partially comprised of at least one partial circumference surface (5, 6) of at least one conical surface.

14 Claims, 10 Drawing Sheets

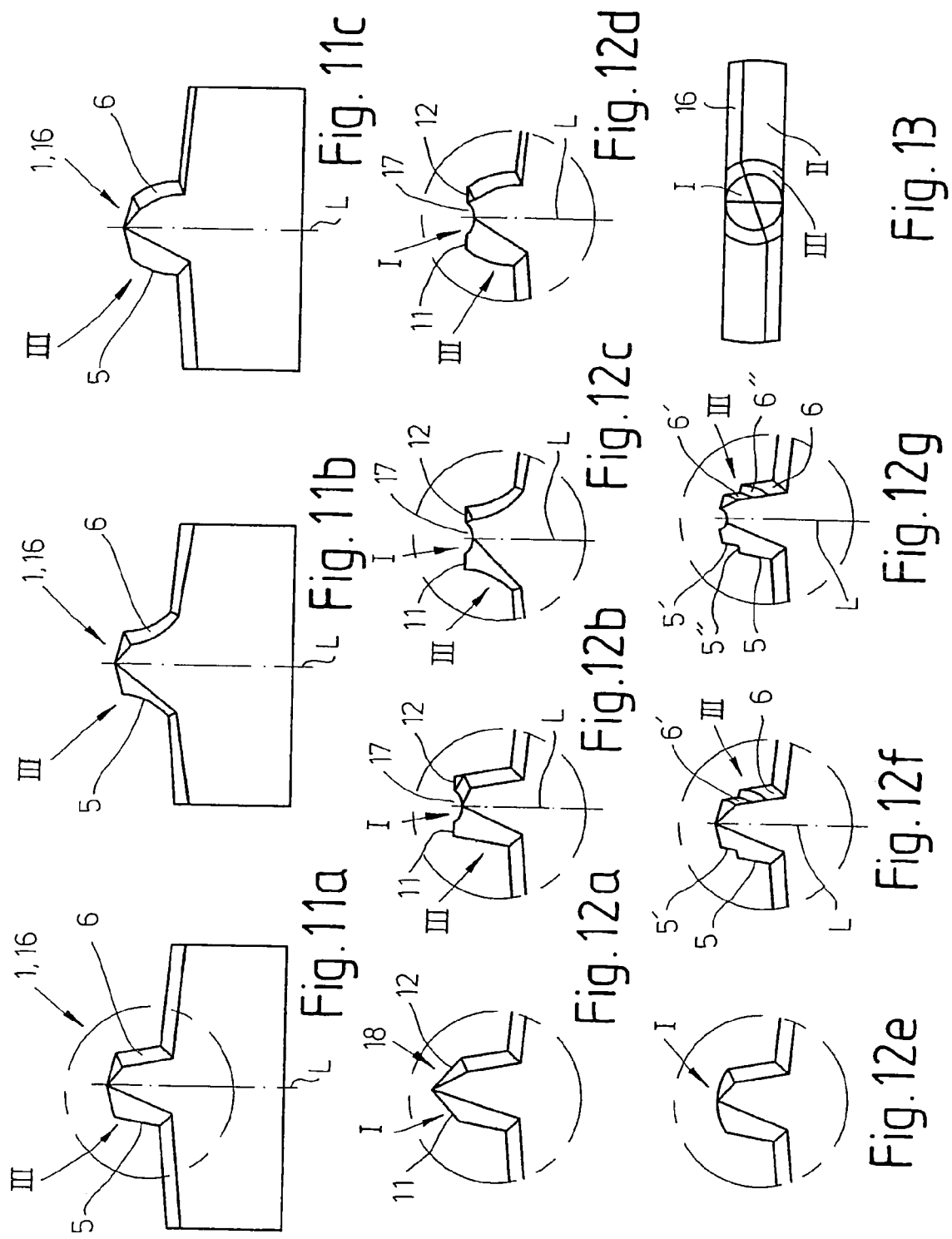

DRILLING AND/OR CHISELING TOOL

CROSS-REFERENCE

The invention described and claimed hereinbelow is also described in PCT/DE 2004/002109, filed on Sep. 23, 2004, DE 103 53 730.9, filed on Nov. 17, 2003, and DE 10 20044017286.2, filed Apr. 5, 2004. This German Patent Application, whose subject matter is incorporated here by reference, provides the basis for a claim of priority of invention under 35 U.S.C. 119 (a)-(d).

BACKGROUND OF THE INVENTION

The present invention relates to a drilling and/or chiseling tool according to the preamble to claim 1.

Tools are known from the prior art, for example from patent disclosures EP 0 761 927 A1, DE 100 38 039 A1, and DE 44 06 513 A1, which have a hard metal cutting element situated at the machining end of the tool head; a radially outer, second working region of the hard metal cutting element is set back in relation to a central, first working region of the hard metal cutting element and the two working regions transition into each other via a third working region. Trials with corresponding tools have shown that particularly when drilling concrete or plate-reinforced casings or steel casings, a borehole cross section is produced whose geometric form corresponds approximately to a so-called Reuleaux triangle. This borehole cross section is typical for drills with two cutting edges and it is produced because the outer ends of the cutting edges stick to the borehole wall or borehole rim. The point at which the cutting edge sticks temporarily becomes the rotation point for the entire tool, producing an outwardly curved lateral edge typical of the Reuleaux triangle. Tools with three main cutting edges produce borehole cross sections that are embodied in the form of squares with outwardly curved lateral edges. These out-of-round borehole cross sections result, for example, in difficulties when inserting metal dowel pins since these are designed for circular cross sections and cylindrical boreholes. The circle inside the Reuleaux triangle is too small for the dowel pin.

SUMMARY OF THE INVENTION

The object of the present invention is to develop a drilling and/or chiseling tool, which is suitable for producing boreholes that have a circumferential surface that corresponds to a circular cylindrical surface over the entire depth of the borehole, especially in the region of the borehole rim and in particular, permits the precisely fit insertion of dowel pins.

The present invention is based on the recognition that a circular cross section of the borehole can only be achieved if the drilling and/or chiseling tool is prevented from being able to rotate around an eccentric rotation axis extending parallel to its longitudinal axis whenever a main cutting edge sticks to the borehole wall or the borehole rim. In order to prevent such temporary shifts in the rotation axis, according to the present invention, the centering action of the drilling and/or chiseling tool is reinforced so that the longitudinal axis remains the rotation axis even when the drilling and/or chiseling tool sticks to the borehole wall or the borehole rim. This reinforced centering action is achieved according to the present invention by means of at least one specially embodied surface in the third working region of the drilling and/or chiseling tool, which surface is embodied as part of a rotationally symmetrical surface, in particular a conical surface or spherical surface. By contrast with a flat surface extending obliquely in relation to the longitudinal axis of the drill or a cylindrical surface extending parallel to the longitudinal axis of the drill, the conical surface produces a more powerful centering action of the drilling and/or chiseling tool since the entire surface remains in constant contact with the material to be machined. Consequently, when it sticks in the third working region, the drilling and/or chiseling tool is supported on the material to be machined not with only an edge or a cylindrical surface that is loosely guided due to its constant cross section, but firmly contacts the material to be machined over its entire surface. As a result, the central rotation axis is maintained even in the presence of powerful transverse forces because this special surface is able to exert sufficiently powerful counteracting forces.

Also according to the present invention, the third working region of the drilling and/or chiseling tool has at least two partial circumference surfaces, which are aligned symmetrically in relation to the longitudinal axis of the drilling and/or chiseling tool. It is thus possible to associate each main cutting edge with a partial circumference surface and to position this surface so as to optimally absorb the forces that can be generated when the outer ends of the main cutting edges stick.

According to the present invention, the partial circumference surfaces are delimited in the direction of the longitudinal axis of the drilling and/or chiseling tool by curves with a varying curvature. This produces regions that are similar to a round chisel and penetrate with little resistance into the material to be machined.

According to the present invention, the partial circumference surface is embodied at an angle of $0°<\alpha<45°$ and preferably $5°$ to $25°$ in relation to the longitudinal axis of the drilling and/or chiseling tool. This assures the third working region of being able to easily penetrate into the material. In addition, the relatively steeply pitched orientation of the partial circumference surface prevents it from too aggressively machining the material that it contacts during drilling and/or chiseling operation and thus sharply reduces the supporting force of the material facing it.

According to the present invention, the central, first working region and the third working region together constitute a centering tip, which protrudes above the outer, second working region in the working direction. This centering tip, which is comprised of two regions—a central, first region and an annular, third region—can also be referred to as a centering tip that has an active, central region, which promotes the forward progress of the tool, and a centering annular region, which fixes the direction of the forward progress, and is thus optimized for two different tasks.

Also according to present invention, the cutting edges of the central, first working region are aligned in a roof shape. This makes it easier to start drilling at a precise point.

According to the present invention, the main cutting edges of the radially outer, second working region are aligned in a roof shape. This facilitates the penetration of the tool into the material to be machined.

Embodying the hard metal cutting element in the form of a solid hard metal head or a cutting plate makes it possible to use the cutting element geometry according to the invention for designs of drilling and/or chiseling tools currently in use.

According to the invention, the hard metal cutting element can be comprised of several parts, in particular at least one cutting plate and one centering tip. This makes it possible to use different hard metals for the hard metal cutting element and to select them for the specific stresses involved.

According to the invention, the main cutting edge of the second working region is associated with a relief face, which, in the direction of the longitudinal axis of the drilling and/or chiseling tool, is delimited at the radially outer edge by a clothoid or a polygon curve that approximates a clothoid. This permits a particularly solid embodiment of the area surrounding the main cutting edge. Such a design increases the inherent stability of the hard metal cutting element and permits the use of harder hard metals than conventional hard metal cutting elements. The use of this design also extends the service life of the tool. Furthermore, the large relief faces function as supports when drilling in the region of reinforcements.

Also according to the invention, a rake face of a secondary cutting edge situated in the second working region following the main cutting edge is delimited at the radially outer edge by an extension of the clothoid or the polygon curve. This makes it possible to achieve the solid embodiment of the hard metal cutting element with the above-mentioned advantages for the hard metal cutting element as a whole.

According to an advantageous embodiment of the invention, the relief face of the main cutting edge of the second working region and the cuttings surface of the secondary cutting edge of the second working region together constitute a common, arched surface with no sharp edges.

The solid character of the hard metal cutting element is further increased if the relief face of the secondary cutting edge of the second working region, viewed from above, is delimited at the radially outer edge by an extension of the clothoid or the polygon curve that approximates a clothoid.

Finally according to the invention, the rake faces and relief faces of the main cutting edges and secondary cutting edges of the second working region, viewed from above, are delimited by an approximately S-shaped contour. This yields a solid hard metal cutting element with a high degree of inherent stability.

Further details and advantages of the present invention ensue from the following description of exemplary embodiments of the invention that will be explained in greater detail in conjunction with the drawings.

BRIEF DESCRIPTION OF THE DRAWINGS

FIGS. 12a-12g show detailed views of various hard metal cutting elements, and FIG. 13 is a schematic top view of the hard metal cutting elements according to FIGS. 11a-12g.

DETAILED DESCRIPTION OF THE PREFERRED EMBODIMENTS

Figure 1:
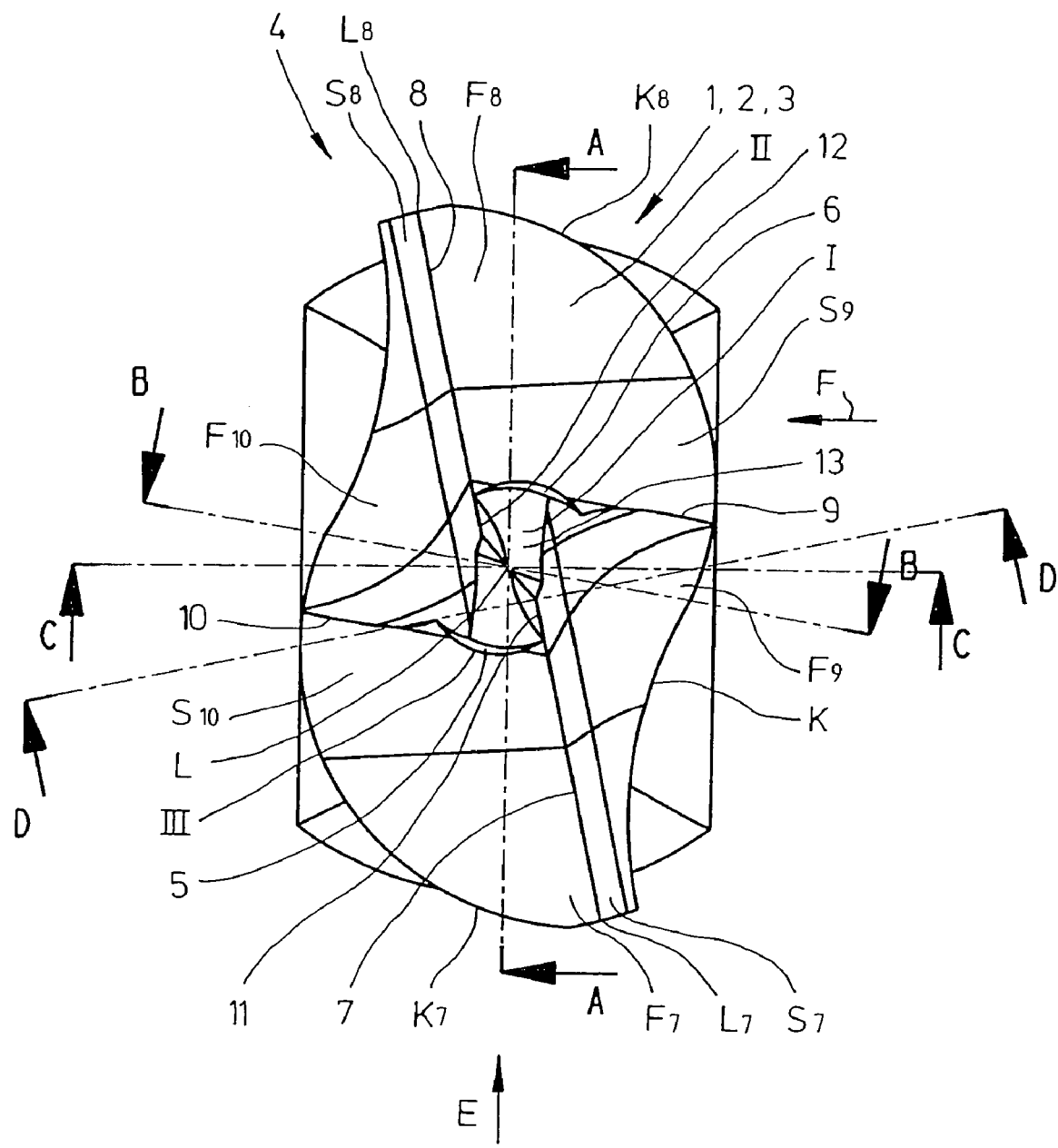
FIG. 1 is a top view of a hard metal cutting element, viewed in the direction of the longitudinal axis of the drilling and/or chiseling tool.

FIG. 1 is a top view of a hard metal cutting element 1, which is embodied in the form of a solid hard metal head 2. The solid hard metal head 2, which is a drill bit head 3, is supported on a helical shaft, not shown, which in turn transitions into a clamping shank and a clamping end that are not shown. Together with the helical shaft and the clamping shank, the drill bit head 3 constitutes a rotary hammer bit or a drilling and/or chiseling tool 4. The clamping shank is embodied in the form of a so-called SDS plus clamping shank or SDS max clamping shank. In its basic design, the drill bit head 3 or the solid hard metal head 2 has a first, central working region I and a second, approximately annular working region II that is set back in relation to the first working region I, the two working regions I and II transitioning into each other via a third, approximately annular working region III. The third working region III bridges the height difference $H_{I-II}$ (see FIG. 6) between the working regions I and II. The third working region III has two partial circumference surfaces 5 and 6, which are embodied in the form of partial surfaces of an imaginary cone, not shown, whose longitudinal axis lies on a longitudinal axis L of the rotary hammer bit 4. The partial circumference surfaces 5 and 6 are respectively situated in the extension of the main cutting edges 7 and 8 in the second working region II. The solid hard metal head is mirror symmetrical in relation to the longitudinal axis L in all three working regions I, II, and III. The main cutting edges 7 and 8 are each associated with a respective rake face $S_7$ and $S_8$ and a relief face $F_7$ and $F_8$. The relief faces $F_7$ and $F_8$, viewed from above, are delimited at the radially outer edge by clothoids $K_7$ and $K_8$. According to an embodiment variant that is not shown, these relief faces are delimited by polygon curves. Transverse to the main cutting edges 7 and 8, the working region II contains secondary cutting edges 9 and 10, each with a respective relief face $F_9$ and $F_{10}$ and rake face $S_9$ and $S_{10}$. The relief face $F_8$ of the main cutting edge 8 transitions with no sharp edges into the rake face $S_9$ of the secondary cutting edge 9. The rake face $S_9$ and the relief face $F_9$ here are delimited at the radially outer edge by the clothoid $K_8$ that extends past the secondary cutting edge 9. Likewise, the relief face $F_7$ of the main cutting edge 7 transitions with no sharp edges into the rake face $S_{10}$ of the secondary cutting edge 10. The rake face $S_{10}$ and the relief face $F_{10}$ here are delimited at the radially outer edge by the clothoid $K_7$ that extends past the secondary cutting edge 10.

Viewed from above, the working regions I, II, and III lie within a sweeping S-shaped contour K largely defined by the clothoids $K_7$ and $K_8$ that is angular only in the region of the main cutting edges 7 and 8.

The third working region III is essentially characterized by the partial circumference surfaces 5 and 6, which guide the rotary hammer bit 4 in the borehole as soon as the working region I has penetrated into the material to be machined. By contrast with flat surfaces standing upright but obliquely in relation to the longitudinal axis L of the rotary hammer bit 4, the embodiment of the partial circumference surfaces 5 and 6 as segments of a conical surface K (see FIG. 5a) assures a constant, even contact with the material to be machined and a support of the drill bit head 3 against the material over a large area as the rotary hammer bit 4 rotates. The fact that the partial circumference surfaces 5 and 6 are inclined in relation to the longitudinal axis L of the rotary hammer bit 4 means that as the drilling progresses, the wedge-like penetration into the material causes the partial circumference surfaces 5 and 6, by contrast with partial circumference surfaces of a cylinder, to continuously work into the material in the advancing direction, thus constantly renewing the contact with the material. As a result, the partial circumference surfaces 5 and 6 more effectively support the drill bit head 3 on the material to be machined, thus making it possible to prevent the rotary hammer bit 4 from undesirably rotating around a rotation axis $L_7$ or $L_8$ lying outside the longitudinal axis L of the rotary hammer bit 4. In conventional rotary hammer bits, these eccentric rotation axes always temporarily come into existence when a cutting edge sticks to the material to be machined.

The working region I is essentially defined by the cutting edges 11 and 12, which penetrate into the material to be machined before the partial circumference surfaces 5 and 6. The working region I, with its drilling and/or hammering action, and the working region II, with its centering and support functions, together constitute a centering tip 13, which is optimally designed for machining materials such as concrete, rock, masonry, and the like.

Figure 2A:
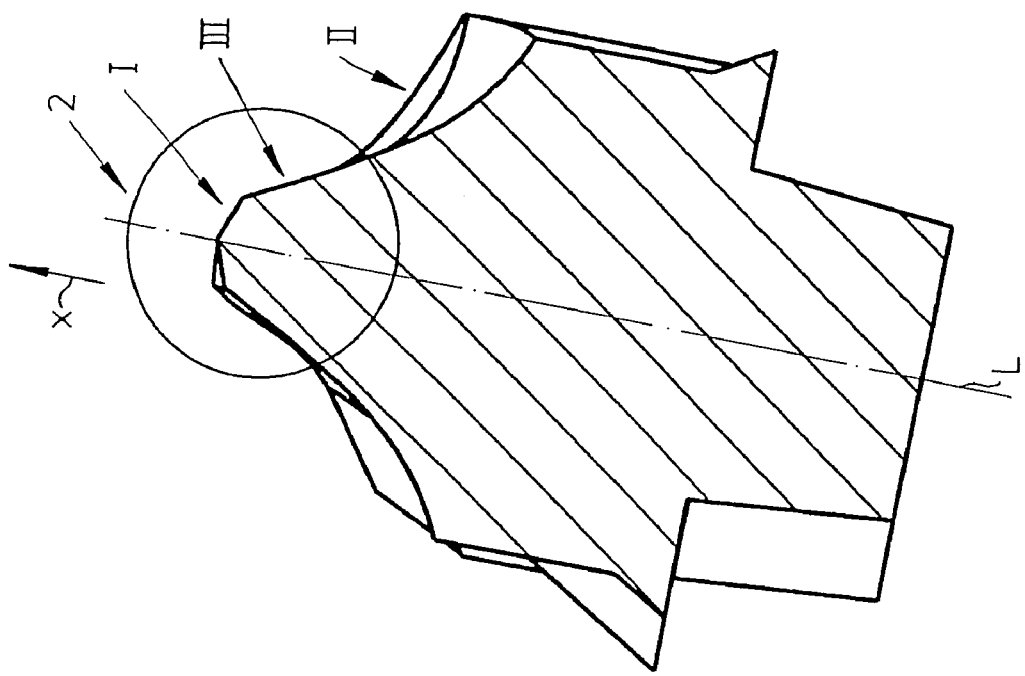
FIG. 2a is a section along the cutting line B-B through the hard metal cutting element shown in FIG. 1.
Figure 2B:
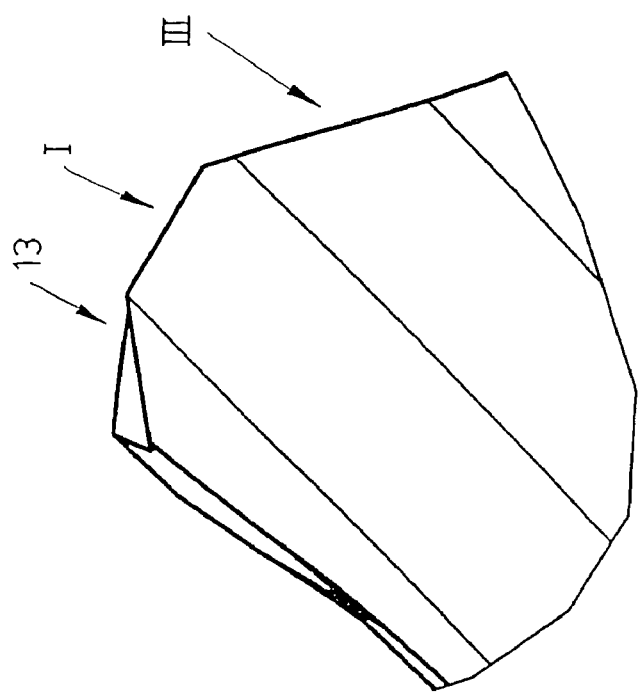
FIG. 2b shows an enlarged detail from FIG. 2a, FIG. 3a is a section along the cutting line C-C through the hard metal cutting element shown in FIG. 1.

FIG. 2*a* is a section along the cutting line B-B through the solid hard metal head 2 shown in FIG. 1. This view shows how the working regions I, II, and III are offset from one another in the direction of the longitudinal axis L. The slightly roof-shaped working region I is followed by the steeply pitched working region III surrounding it, which is followed by the working region II, which is also roof-shaped. The working regions I, II, and III work into the material to be machined in a working direction x. FIG. 2*b* shows an enlargement of the centering tip 13 constituted by the working regions I and III.

Figure 3B:
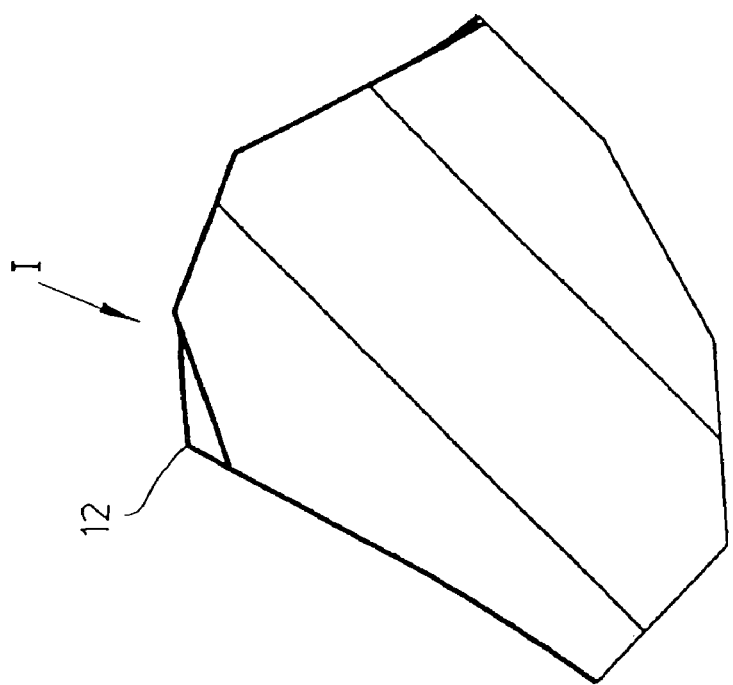
FIG. 3b shows an enlarged detail from FIG. 3a, FIG. 4a is a section along the cutting line D-D through the hard metal cutting element shown in FIG. 1.
Figure 3A:
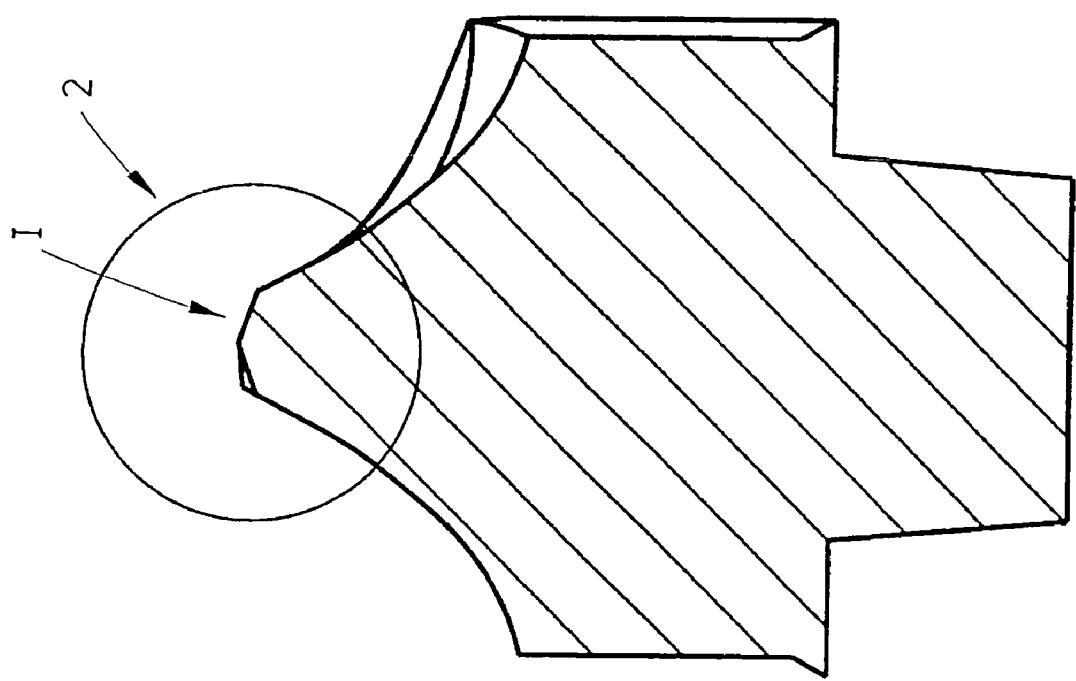

FIG. 3*a* is another section through the solid hard metal head 2 shown in FIG. 1. The section extends along the cutting line C-C. FIG. 3*b* shows a detailed view of the cutting edge 12 in working region I of the solid hard metal head 2.

Figure 4B:
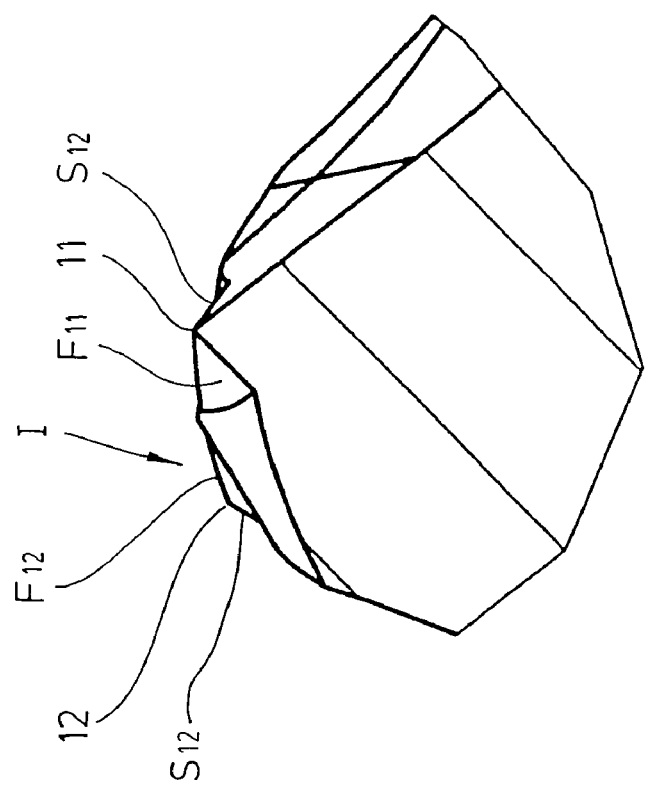
FIG. 4b shows an enlarged detail from FIG. 4a, FIG. 5a is a section along the cutting line A-A through the hard metal cutting element in FIG. 1.
Figure 4A:
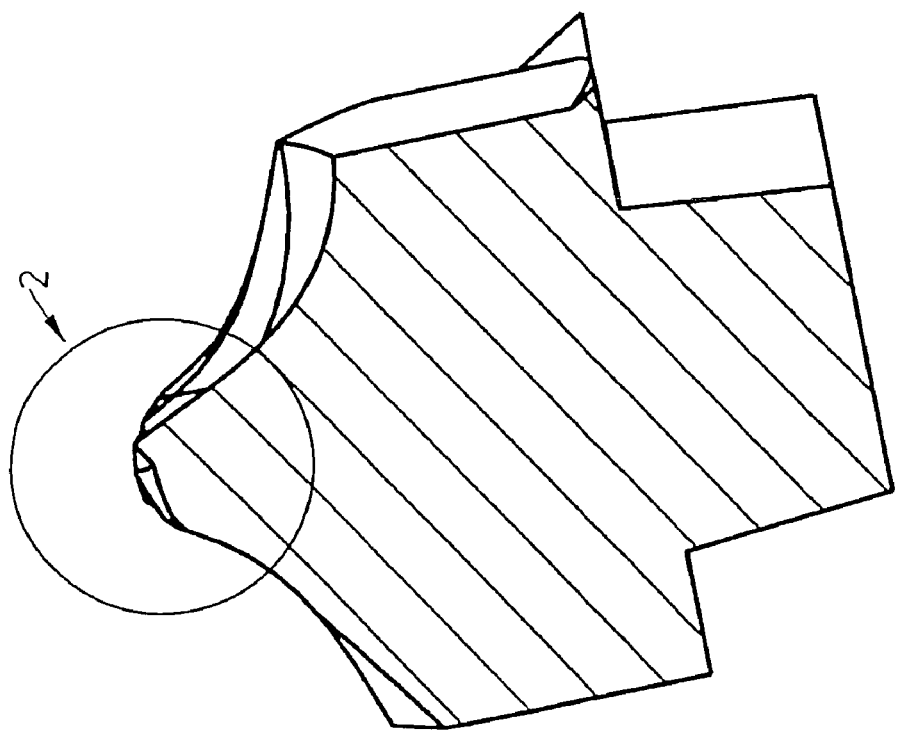

FIG. 4*a* is another section through the solid hard metal head 2 shown in FIG. 1. The section extends along the cutting line D-D. A detail of this sectional view (see FIG. 4*b*) shows a segment of the cutting edge 11 and parts of the rake face $S_{11}$ and relief face $F_{11}$ belonging to it. The drawing also shows the cutting edge 12 as well as the rake face $S_{12}$ and relief face $F_{12}$ asociated with it in working region I.

Figure 5B:
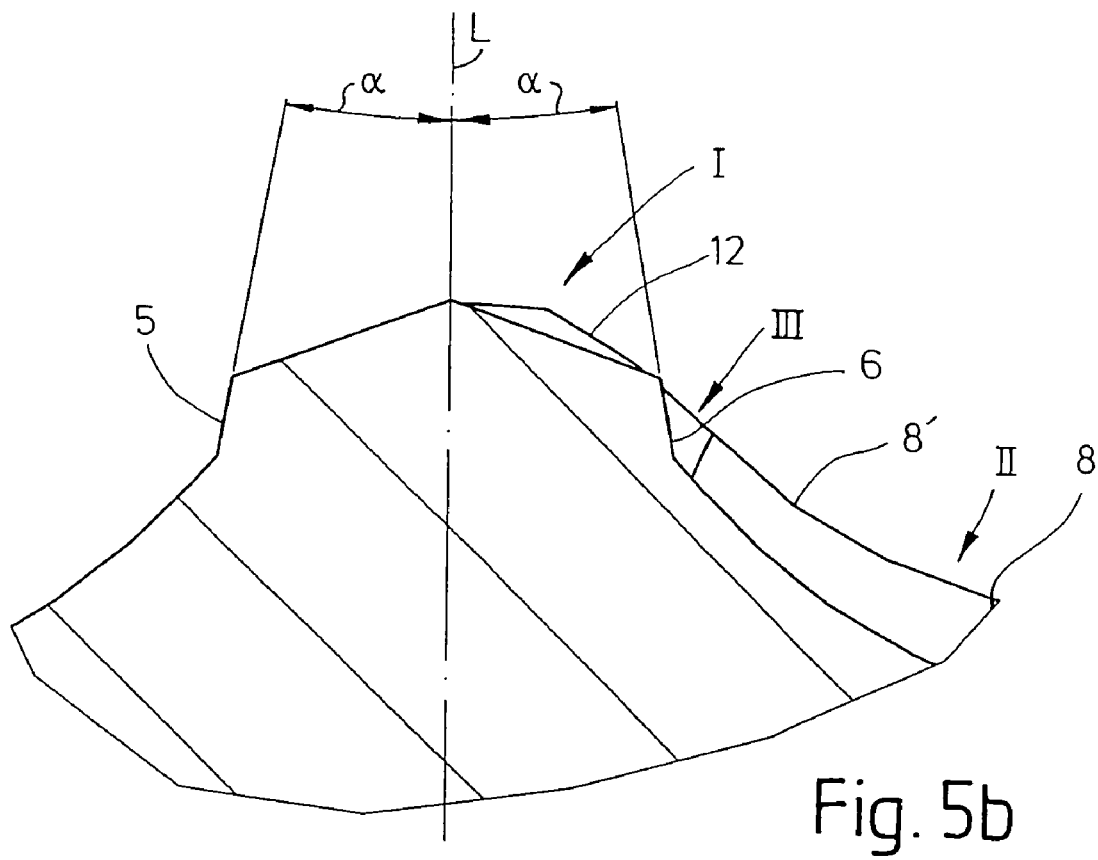
FIG. 5b shows an enlarged detail from FIG. 5a, FIG. 6 is a side view from an arrow direction E of the hard metal cutting element shown in FIG. 1.
Figure 5A:
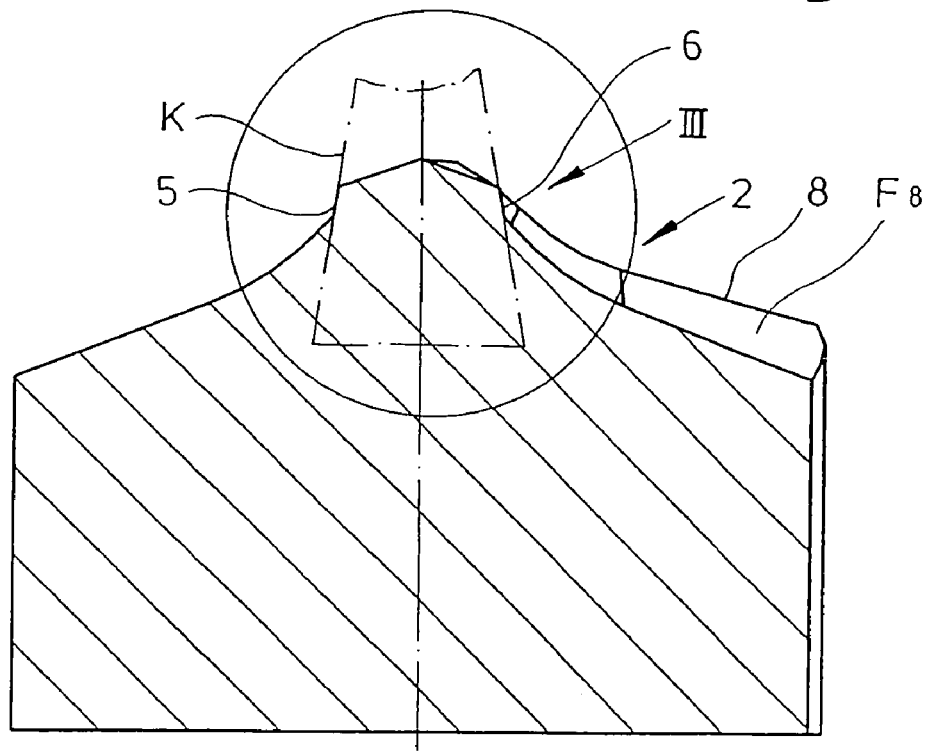

Finally, FIG. 5*a* shows a section, which is cut approximately in accordance with the cutting line A-A shown in FIG. 1, through the solid hard metal head 2. This view shows the main cutting edge 8 and a part of the relief face F8 preceding it. The imaginary cone K that defines the partial circumference surfaces 5 and 6 is also indicated. The main cutting edge 8 extends to the working region III (see FIG. 5*b*) and is continued in it by an edge 8', which in turn transitions into the cutting edge 12 of the working region I. The partial circumference surfaces 5 and 6 each extend at an angle α=10° in relation to the longitudinal axis L.

Figure 6:
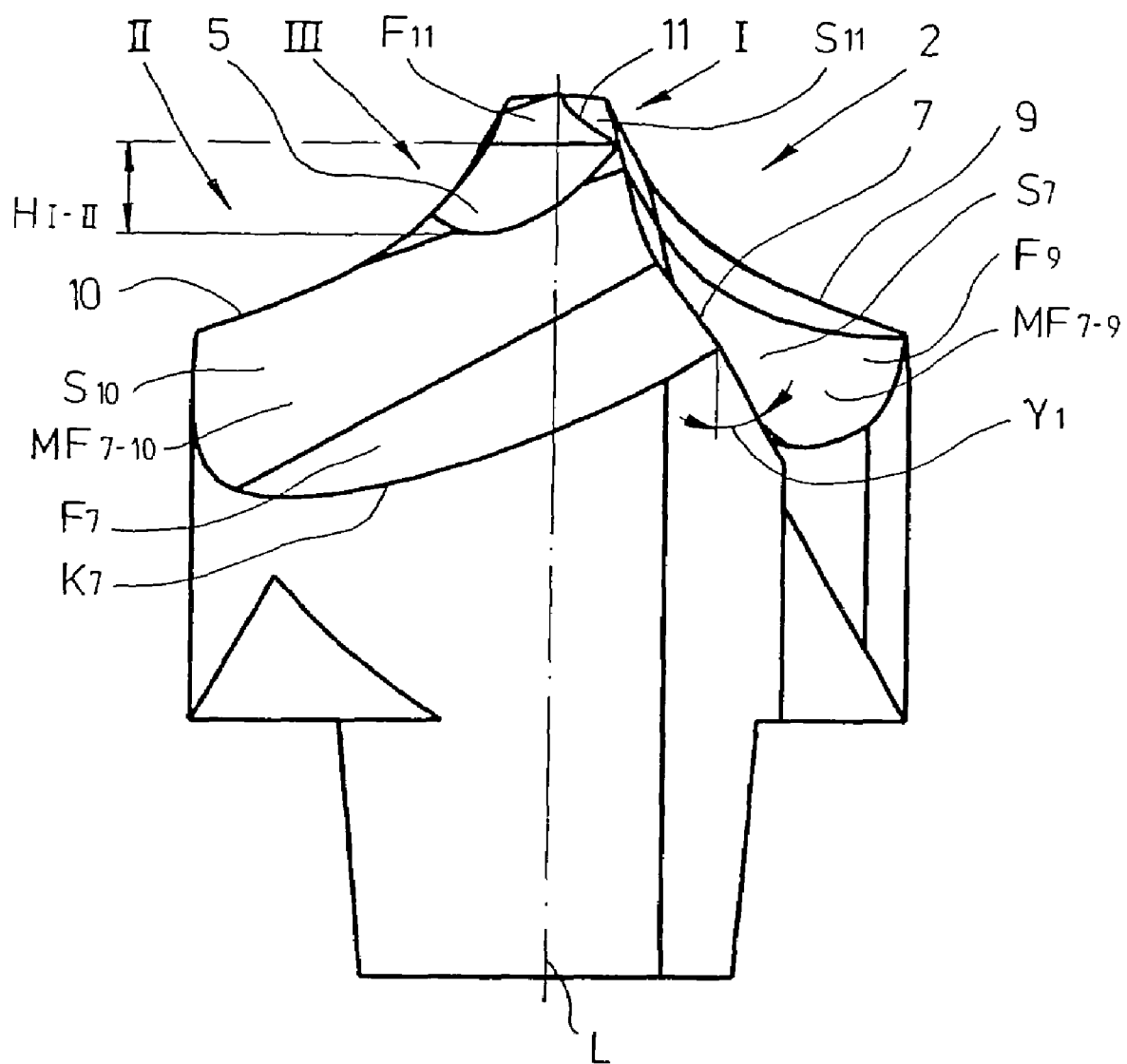

FIG. 6 is a side view from an arrow direction E of the solid hard metal head 2 shown in FIG. 1. Between the main cutting edge 7 and the secondary cutting edge 10, the relief face $F_7$ of the main cutting edge 7 and the rake face $S_{10}$ of the secondary cutting edge 10 form a trough-like curved flank $MF_{7-10}$, which is delimited at the radially outer edge by the clothoid $K_7$ and at this point, drops away parallel to the longitudinal axis L. Between the main cutting edge 7 and the secondary cutting edge 9, the rake face $S_7$ of the main cutting edge 7 and the relief face $F_9$ of the secondary cutting edge 9 also form a trough-like curved flank $MF_{7-9}$, the main cutting edge 7 having a negative rake angle $\gamma_1$. In the working region II, the two flanks $MF_{7-10}$ and $MF_{7-9}$ slope upward toward the working region III. Viewing the solid hard metal head 2 from a direction opposite from the arrow direction E yields a corresponding view due to the centrosymmetrical design of the hard metal head 2. In the working region II, the partial circumference surface 5 is visible, which is delimited on its side toward the working region I by the relief face $F_{11}$ of the cutting edge 11 situated in the working region I. The rake face $S_{11}$ is also visible. The double arrow indicates the height difference $H_{I-II}$ that exists between the working regions I and II and is bridged by the working region III and in particular, its partial circumference surfaces.

Figure 7:
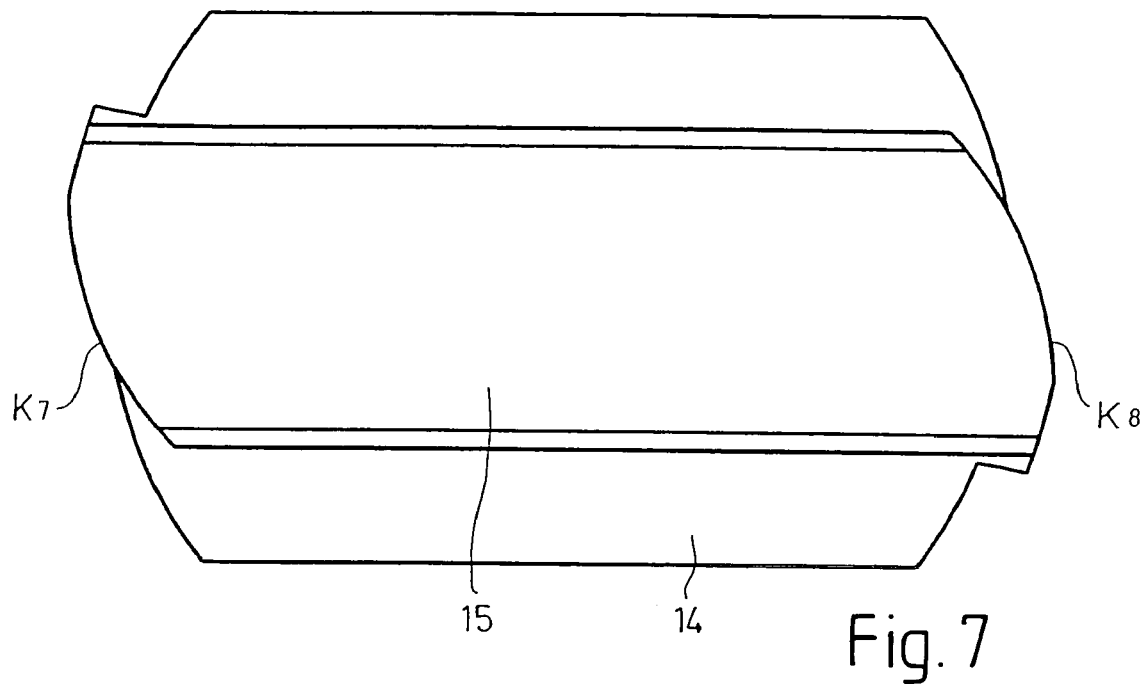
FIG. 7 is a bottom view of the hard metal cutting element shown in FIG. 1.

FIG. 7 is a bottom view of the solid hard metal head 2 shown in FIG. 1. This view shows a base 14 that is located underneath a substructure 15 and serves to fasten the solid hard metal head in a slot of a helical shaft that is not shown. The base and the substructure both have a clothoidal curve in the middle region of their sides.

Figure 8:
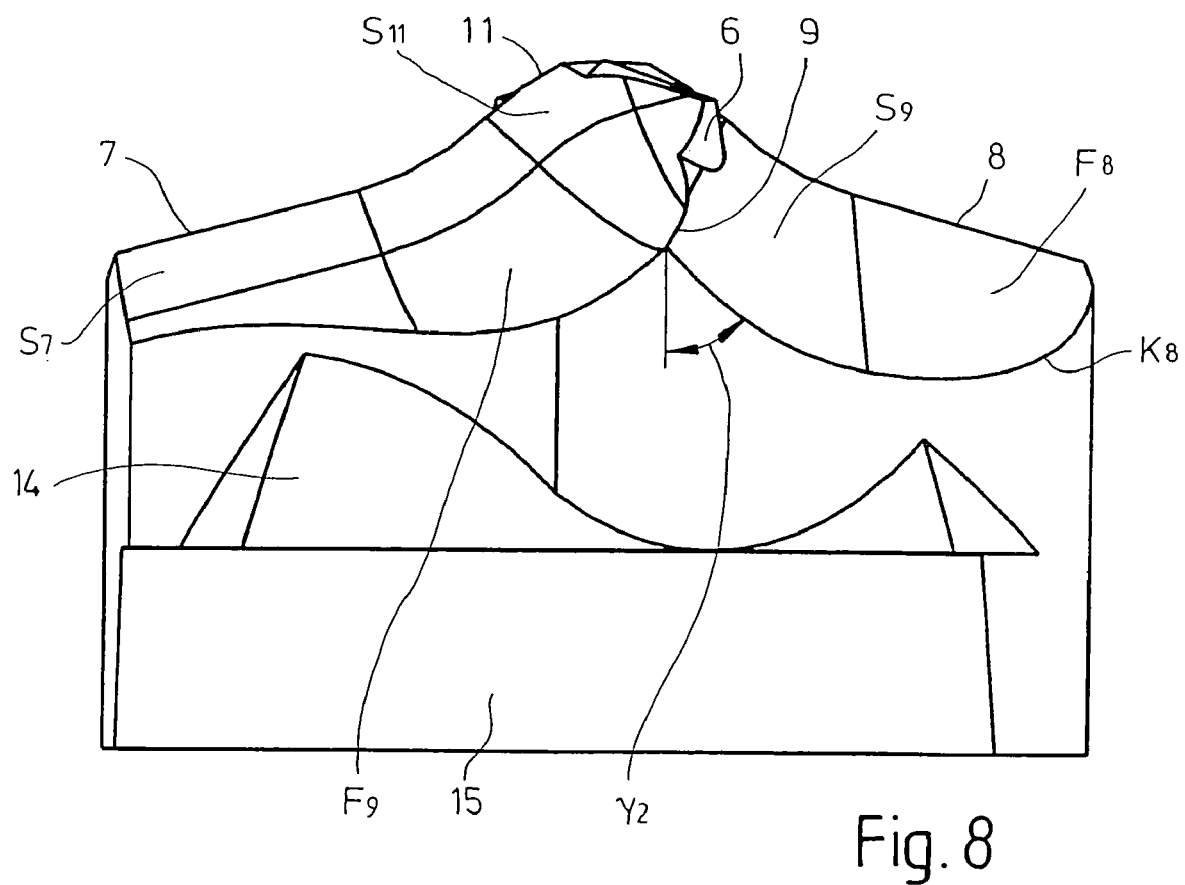
FIG. 8 is a side view from an arrow direction F of the hard metal cutting element shown in FIG. 1.

FIG. 8 is a side view from an arrow direction F of the solid hard metal head 2 shown in FIG. 1. This view also shows the base 15 and the solid substructure 14 of the solid hard metal head 2. It is clear in the side view that the secondary cutting edge 11 also has a negative rake angle $\gamma_2$.

Figure 9:
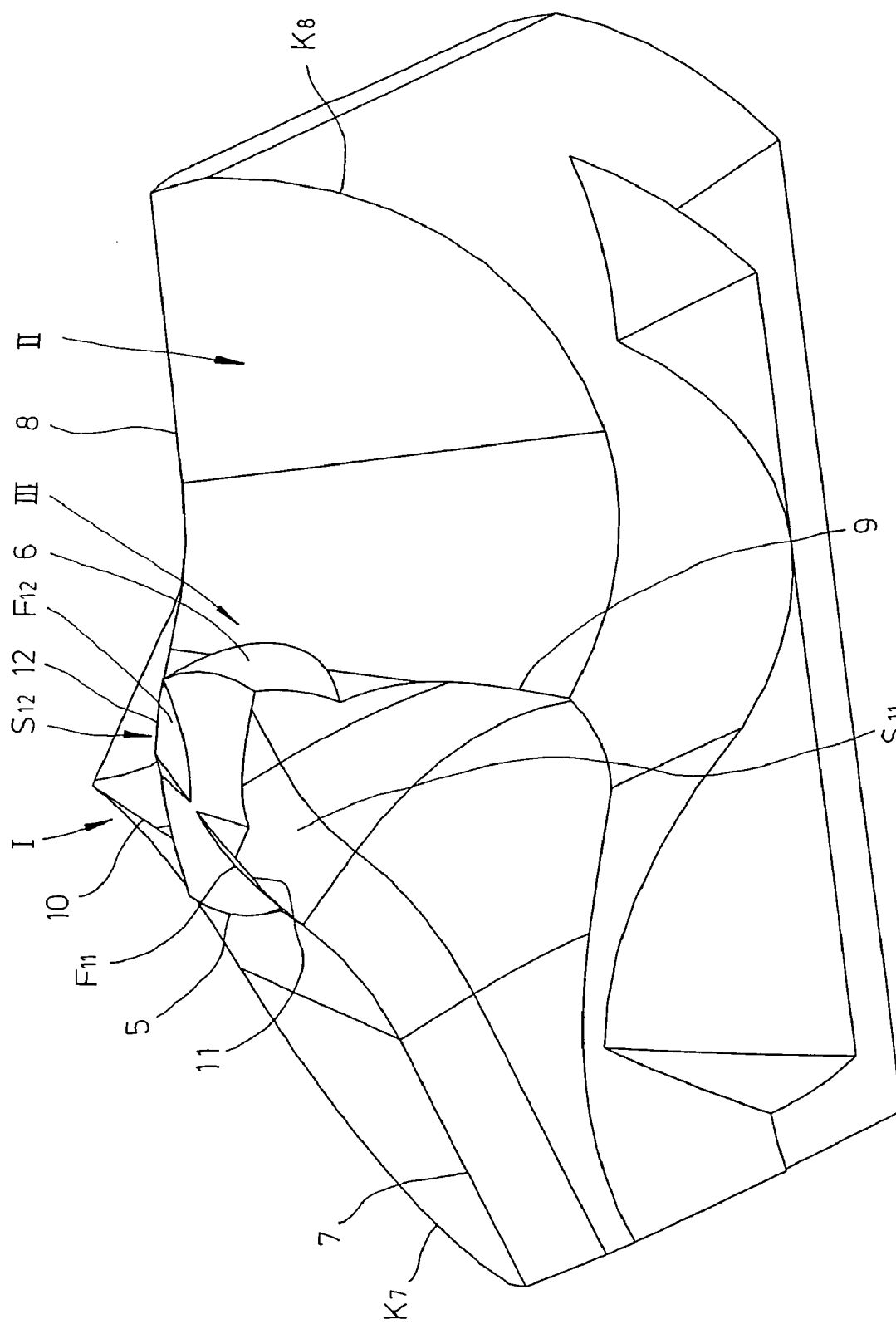
FIG. 9 is a perspective view of the hard metal cutting element shown in FIGS. 1 to 8.

FIG. 9 shows a first perspective view of the solid hard metal head 2 shown in FIG. 1. This view shows both of the cutting edges 11 and 12 of the first working region I with the associated rake faces $S_{11}$ and $S_{12}$ and the associated relief faces $S_{11}$ and $S_{12}$. The third working region III, which is situated in a ring around the first working region I, is dominated by the two partial circumference surfaces 5 and 6 and transitions into the second working region II. In the perspective depiction, a segment of the secondary cutting edge 10 is also visible behind the first working region I. The trough-shaped flanks $MF_{8-9}$ and $MF_{7-10}$ situated between the cutting edges 8 and 9 and between the cutting edges 7 and 10 are delimited at the radial outside by edges $K_7$ and $K_8$, which extend in clothoidal curves, when viewed from above.

Figure 10:
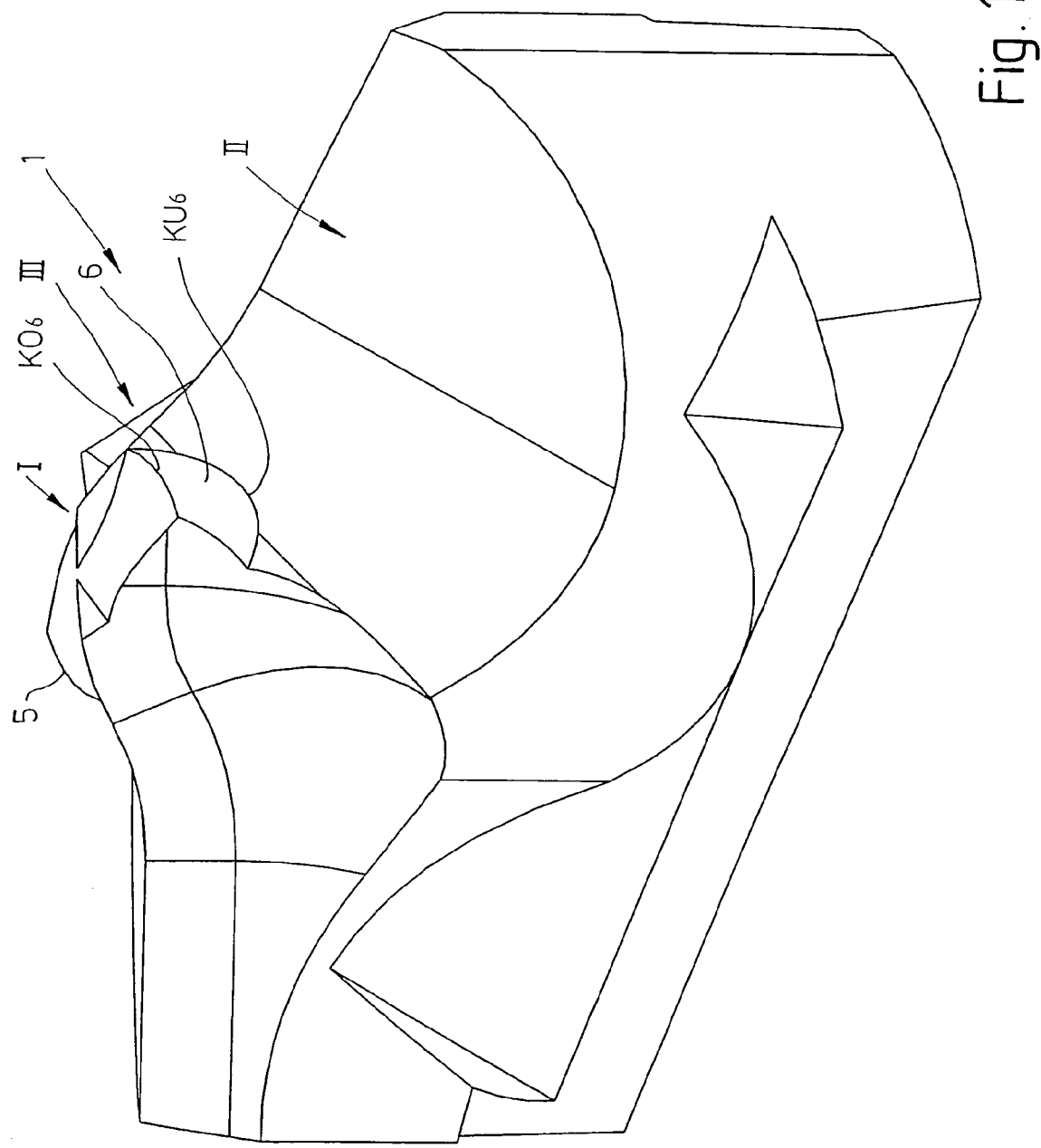
FIG. 10 is another perspective view of the hard metal cutting element shown in FIGS. 1 to 8, FIGS. 11a-11c show side views of various hard metal cutting elements.

FIG. 10 shows a second perspective view of the solid hard metal head 2 shown in FIG. 1. The partial circumference surface 6 situated in the working region III transitions into the working region I at an upper edge $KO_6$ and transitions into the working region II at a lower edge $KU_6$. The edges $KO_6$ and $KU_6$ are embodied in the form of curves.

FIGS. 11*a* to 11*c* show three hard metal cutting elements 1, which are embodied in the form of hard metal cutting plates 16 and have different third regions III. The partial circumference surfaces 5 and 6 of the hard metal cutting plate 16 shown in FIG. 11*a* are partial surfaces of an imaginary right circular cone whose central axis coincides with the longitudinal axis L of the hard metal cutting plate 16. FIG. 11*b* shows a hard metal cutting plate 16, which, in a working region III, has partial surfaces 5 and 6 of a right circular cone that has a curved, concave circumference surface in relation to the longitudinal axis. By contrast, the partial surfaces 5 and 6 of a hard metal cutting plate 16 shown in FIG. 11*c* are embodied as partial surfaces of an imaginary right circular cone that has a convex, outwardly curved circumference surface.

FIGS. 12*a* to 12*e* show embodiment variants for the working region I of the hard metal cutting plate 16 that differ from FIGS. 11*a* to 11*c*. FIG. 12*a* shows a working region I in which the cutting edges 11 and 12 form a roof-shaped tip 18. FIGS. 12*b* to 12*d*, however, each show a working region I that is delimited by two cutting edges 11 and 12 situated perpendicular to a longitudinal axis L and a centrally situated recess 17, the working regions III being embodied in accordance with those in FIGS. 11*a* to 11*c*.

FIG. 12e shows a dome-shaped working region I. FIGS. 12f and 12g show working regions III that each have four partial circumference surfaces 5, 5' and 6, 6'; the partial circumference surfaces 5 and 6 are situated on a first imaginary right circular cone, the partial circumference surfaces 5' and 6' are situated on a second imaginary right circular cone, and the second imaginary right circular cone is situated inside the first imaginary right circular cone. Between the partial circumference surfaces 5, 5', 6, and 6' there is thus a shoulder 5" and 6", which is embodied in the form of a partial circumference surface of a particularly flat imaginary cone. According to an embodiment version that is not shown, the shoulder is embodied perpendicular to a longitudinal axis of the hard metal cutting plate, in the form of a partial surface of a circular ring.

Finally, FIG. 13 is a schematic top view of the hard metal cutting plate 16 shown in FIGS. 11a to 12g, with three working regions I, II, and III.

The present invention is not limited to the exemplary embodiments depicted or described. On the contrary, it also includes modifications of the invention within the scope defined by the claims.

REFERENCE NUMERAL LIST 1 hard metal cutting element
2 solid hard metal head
3 drill bit head
4 rotary hammer bit/drilling and/or chiseling tool
5 first partial circumference surface in working region III
5', 5" additional partial circumference surface or shoulder
6 second partial circumference surface in working region III
6', 6" additional partial circumference surface or shoulder
7, 8 main cutting edge in working region II
8' edge, extension of 8
9, 10 secondary cutting edge in working region II
11, 12 cutting edge in working region I
13 centering tip
14 substructure of 2
15 base of 2
16 hard metal cutting plate
17 recess in working region I
18 roof-shaped tip in working region I
I, II, III first, second, and third working region
α angle between 5 or 6 and L
$\gamma 1$, $\gamma 1$ rake angle at 7, 8 and 9, 10
$F_7$-$F_{12}$ relief face of 7, 8, 9, 10, 11, and 12
$H_{I-II}$ height difference between working regions I and II
K imaginary cone
$KO_6$, $KU_6$ upper and lower edge of 6
$K_7$, $K_8$ clothoids
L longitudinal axis of 4
$L_7$, $L_8$ eccentric rotation axis parallel to L
$MF_{7-9}$ trough-shaped flank between 7 and 9
$MF_{7-10}$ trough-shaped flank between 7 and 10
$MF_{8-9}$ trough-shaped flank between 8 and 9
$S_7$-$S_{12}$ rake face of 7, 8, 9, 10, 11, and 12
x working direction

What is claimed is:

1. A drilling and/or chiseling tool (4) for machining materials such as concrete, rock, and masonry, having a hard metal cutting element (1) situated at the machining end, a radially outer, second working region (II) of the hard metal cutting element (1) being set back in relation to a central, first working region (I) of the hard metal cutting element (1) and the two working regions (I, II) transitioning into each other via a third working region (III), wherein the third working region (III) is at least partially comprised of at least one partial circumference surface (5, 6) of at least one conical and/or spherical surface (K), wherein the solid hard metal head (1) is mirror symmetrical in relation to a longitudinal axis (L) in all three working regions (I, II, III), wherein a main cutting edge (8) extends to the third working region (III) and is continued in it by an edge (8'), wherein said edge (8') in turn transitions into a cutting edge (12) of the first working region (I), wherein the drilling and/or chiseling tool (4) is supported on the material to be machined and firmly contacts material to be machined over its entire surface (5, 6) since the entire surface (5, 6) remains in constant contact with the material to be machined and wherein the partial circumference surface (5, 6) is delimited in the working direction (x) by edges ($KO_6$, $KU_6$) that extend in arcs with varying curvatures.

2. The drilling and/or chiseling tool as recited in claim 1, wherein the partial circumference surface (5, 6) is concavely or convexly curved.

3. The drilling and/or chiseling tool as recited in claim 1, wherein the third working region (III) has at least two partial circumference surfaces (5, 6) situated symmetrically in relation to a longitudinal axis (L) of the drilling and/or chiseling tool (4).

4. The drilling and/or chiseling tool as recited in claim 1, wherein the partial circumference surface (5, 6) extends at an angle (Δ) of 0°<Δ<45° and in particular, between 5° and 25° in relation to the longitudinal axis (L) of the drilling and/or chiseling tool (4).

5. The drilling and/or chiseling tool as recited in claim 1, wherein the central, first working region (I) and the third working region (III) together constitute a centering tip (13), which protrudes above the outer, second working region (II) in the working direction (x) of the drilling and/or chiseling tool (4).

6. The drilling and/or chiseling tool as recited in claim 1, wherein the cutting edges (11,12) of the central, first working region (I) extend in a roof shape.

7. The drilling and/or chiseling tool as recited in claim 1, wherein the main cutting edges (7, 8) of the radially outer, second working region (II) extend in a roof shape.

8. The drilling and/or chiseling tool as recited in claim 1, wherein the hard metal cutting element (1) is embodied in the form of a solid hard metal head (2) or a hard metal cutting plate (16).

9. The drilling and/or chiseling tool as recited in claim 1, wherein the hard metal cutting element (1) can be comprised of several parts, in particular at least one cutting plate and one centering tip.

10. The drilling and/or chiseling tool as recited in claim 1 wherein rake faces ($S_7$, $S_8$, $S_9$, $S_{10}$) and relief faces ($F_7$, $F_5$, $F_9$, $F_{10}$) of the main cutting edges (7, 8) and of secondary cutting edges (9, 10) of the second working region (II), viewed from above, have an approximately S-shaped contour.

11. A drilling and/or chiseling tool (4) for machining materials such as concrete, rock, and masonry, having a hard metal cutting element (1) situated at the machining end, a radially outer, second working region (II) of the hard metal cutting element (1) being set back in relation to a central, first working region (I) of the hard metal cutting element (1) and the two working regions (I, II) transitioning into each other via a third working region (III), wherein the third working region (III) is at least partially comprised of at least one partial circumference surface (5, 6) of at least one conical and/or spherical surface (K), wherein the solid hard metal head (1) is mirror symmetrical in relation to a longitudinal axis (L) in all three working regions (I, II, III), wherein a main cutting edge (8) extends to the third working region (III) and is continued in it by an edge (8'), wherein said edge (8') in turn transitions into a cutting edge (12) of the first working region (I), wherein the drilling and/or chiseling tool (4) is supported on the material to be machined and firmly contacts material to be machined over its entire length (5, 6) since the entire surface (5, 6) remains in constant contact with the material to be machined and wherein the main cutting edge (7, 8) of the second working region (II) is associated with a relief face ($F_7$, $F_8$), which, viewed from above, is delimited at the radially outer edge by a clothoid ($K_7$, $K_8$) or a polygon curve that approximates a clothoid.

12. The drilling and/or chiseling tool as recited in claim 11, wherein an extension of the clothoid ($K_7$, $K_8$) or the polygon curve delimits the radially outer edge of a rake face ($S_9$, $S_{10}$) of a secondary cutting edge (9, 10) situated in the second working region (II).

13. A drilling and/or chiseling tool (4) for machining materials such as concrete, rock, and masonry, having a hard metal cutting element (1) situated at the machining end, a radially outer, second working region (II) of the hard metal cutting element (1) being set back in relation to a central, first working region (I) of the hard metal cutting element (1) and the two working regions (I, II) transitioning into each other via a third working region (III), wherein the third working region (III) is at least partially comprised of at least one partial circumference surface (5, 6) of at least one conical and/or spherical surface (K), wherein the solid hard metal head (1) is mirror symmetrical in relation to a longitudinal axis (L) in all three working regions (I, II, III), wherein a main cutting edge (8) extends to the third working region (III) and is continued in it by an edge (8'), wherein said edge (8') in turn transitions into a cutting edge (12) of the first working region (I), wherein the drilling and/or chiseling tool (4) is supported on the material to be machined and firmly contacts material to be machined over its entire length (5, 6) since the entire surface (5, 6) remains in constant contact with the material to be machined and wherein a relief face ($F_7$, $F_8$) of the main cutting edge (7, 8) of the second working region (II) and the cutting surface ($S_9$, $S_{10}$) of a secondary cutting edge (9, 10) of the second working region (II) together constitute a common, arched surface ($MF_{7-9}$, $MF_{8-10}$) with no sharp edges.

14. A drilling and/or chiseling tool (4) for machining materials such as concrete, rock, and masonry, having a hard metal cutting element (1) situated at the machining end, a radially outer, second working region (II) of the hard metal cutting element (1) being set back in relation to a central, first working region (I) of the hard metal cutting element (1) and the two working regions (I, II) transitioning into each other via a third working region (III), wherein the third working region (III) is at least partially comprised of at least one partial circumference surface (5, 6) of at least one conical and/or spherical surface (K), wherein the solid hard metal head (1) is mirror symmetrical in relation to a longitudinal axis (L) in all three working regions (I, II, III), wherein a main cutting edge (8) extends to the third working region (III) and is continued in it by an edge (8'), wherein said edge (8') in turn transitions into a cutting edge (12) of the first working region (I), wherein the drilling and/or chiseling tool (4) is supported on the material to be machined and firmly contacts material to be machined over its entire length (5, 6) since the entire surface (5, 6) remains in constant contact with the material to be machined and wherein the main cutting edge (7, 8) of the second working region (II) is associated with a relief face ($F_7$, $F_8$), which, viewed from above, is delimited at the radially outer edge by a clothoid ($K_7$, $K_8$) or a polygon curve that approximates a clothoid and wherein a secondary cutting edge (9, 10) of the second working region (II) is associated with a relief face ($F_9$, $F_{10}$), which, viewed from above, is delimited at the radially outer edge by an extension of the clothoid ($K_7$, $K_8$) or the polygon curve that approximates a clothoid.

\* \* \* \* \*

UNITED STATES PATENT AND TRADEMARK OFFICE
Certificate

Patent No. 7,455,129 B2                                         Patented: November 25, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Rainer Widmann, Ravensburg (DE); and Bernhard Moser, Altshausen (DE); Louisville, KY (US).

Signed and Sealed this Nineteenth Day of April 2011.

T. SHANE BOMAR
*Supervisory Patent Examiner*
Art Unit 3676
Technology Center 3600